US011117617B2

(12) United States Patent
Weidig

(10) Patent No.: US 11,117,617 B2
(45) Date of Patent: Sep. 14, 2021

(54) METHOD FOR STEERING A VEHICLE WITH AN AUTOMATIC OPERATING MODE, AND VEHICLE WITH AN AUTOMATIC OPERATING MODE

(71) Applicant: Volkswagen Aktiengesellschaft, Wolfsburg (DE)

(72) Inventor: Marcus Weidig, Wolfsburg (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 169 days.

(21) Appl. No.: 16/474,251

(22) PCT Filed: Dec. 12, 2017

(86) PCT No.: PCT/EP2017/082462
§ 371 (c)(1),
(2) Date: Jun. 27, 2019

(87) PCT Pub. No.: WO2018/121984
PCT Pub. Date: Jul. 5, 2018

(65) Prior Publication Data
US 2019/0337566 A1    Nov. 7, 2019

(30) Foreign Application Priority Data

Jan. 2, 2017    (DE) .................... 10 2017 100 005.4

(51) Int. Cl.
*B62D 15/02*    (2006.01)
*B60Q 3/283*    (2017.01)
(Continued)

(52) U.S. Cl.
CPC .......... *B62D 15/025* (2013.01); *B60Q 3/283* (2017.02); *B62D 1/04* (2013.01); *B62D 1/181* (2013.01);
(Continued)

(58) Field of Classification Search
CPC ........ B62D 15/025; B62D 1/04; B62D 1/181; B62D 1/183; B62D 1/185; B62D 15/02; B62D 15/029; B60Q 3/283
(Continued)

(56) References Cited

U.S. PATENT DOCUMENTS 8,489,281 B2    7/2013  Reichel .................... B62D 1/00
10,053,132 B2   8/2018  Pitzer ..................... B62D 1/046
(Continued)

FOREIGN PATENT DOCUMENTS

DE  10 2010 053 156    6/2012  .............. B62D 6/00
DE  10 2011 109 711    2/2013  .............. B60R 16/02
(Continued)

OTHER PUBLICATIONS

Search Report for PCT Application No. PCT/EP2017/082462, 4 pages, dated Dec. 4, 2018.
(Continued)

*Primary Examiner* — Jonathan M Dager
*Assistant Examiner* — Jean W Charleston
(74) *Attorney, Agent, or Firm* — Slayden Grubert Beard PLLC

(57) ABSTRACT

The invention relates to a method for steering a vehicle with an automatic operating mode, in which a steering angle for a steering device of the vehicle is automatically determined and converted by the steering device. In this case, based on the automatically determined steering angle, a value of an output parameter is determined and the value of the output parameter is output by an output device by means of a light effect. The invention further relates to a vehicle with an automatic operating mode, comprising a control unit by which a steering angle for a steering device of the vehicle is automatically determined, wherein the steering angle can be converted by the steering device, a determination unit, by (Continued)

means of which a value of an output parameter can be determined on the basis of the automatically determined steering angle, and an output device, by means of which the value of the output parameter can be output by means of a light effect.

20 Claims, 8 Drawing Sheets

(51) Int. Cl.
    *B62D 1/04*     (2006.01)
    *B62D 1/181*     (2006.01)
    *B62D 1/183*     (2006.01)
    *B62D 1/185*     (2006.01)

(52) U.S. Cl.
    CPC ............. *B62D 1/183* (2013.01); *B62D 1/185* (2013.01); *B62D 15/02* (2013.01)

(58) Field of Classification Search
    USPC .......................................................... 701/41
    See application file for complete search history.

(56) References Cited

U.S. PATENT DOCUMENTS

| | | | | |
|---|---|---|---|---|
| 10,065,655 | B2 | 9/2018 | Bendewald | B60W 50/082 |
| 2006/0089770 | A1* | 4/2006 | Ito | B62D 1/286 |
| | | | | 701/41 |
| 2007/0153535 | A1* | 7/2007 | Bostick | B60Q 3/283 |
| | | | | 362/488 |
| 2008/0071177 | A1* | 3/2008 | Yanagidaira | G08B 21/06 |
| | | | | 600/483 |
| 2011/0163863 | A1* | 7/2011 | Chatmon | B62D 1/06 |
| | | | | 340/439 |
| 2014/0109719 | A1* | 4/2014 | Lisseman | B60Q 9/00 |
| | | | | 74/552 |
| 2014/0328077 | A1* | 11/2014 | Tovar | B60Q 3/283 |
| | | | | 362/511 |
| 2015/0070160 | A1* | 3/2015 | Davidsson | G05D 1/0061 |
| | | | | 340/457 |
| 2016/0176440 | A1* | 6/2016 | Witte | B62D 6/002 |
| | | | | 701/23 |
| 2016/0304124 | A1* | 10/2016 | Fujiyoshi | G05D 1/0061 |
| 2016/0339915 | A1* | 11/2016 | Kuwahara | B60W 10/06 |
| 2016/0347348 | A1 | 12/2016 | Lubischer et al. | 701/23 |
| 2016/0375925 | A1 | 12/2016 | Lubischer et al. | B62D 1/183 |
| 2017/0151906 | A1 | 6/2017 | Sakuma et al. | 701/41 |

FOREIGN PATENT DOCUMENTS

| | | | | |
|---|---|---|---|---|
| DE | 10 2014 216 105 | | 2/2016 | ............... B62D 1/06 |
| DE | 102014216105 A1 | * | 2/2016 | ............ B62D 15/02 |
| DE | 10 2016 002 456 | | 9/2016 | ............ B60R 16/02 |
| WO | 2015/049254 | | 4/2015 | |
| WO | WO-2015049254 A2 | * | 4/2015 | ............ B60W 50/12 |
| WO | 2015/145674 A1 | | 4/2017 | ............... B62D 1/06 |

OTHER PUBLICATIONS

Office Action for German Application No. 10 2017 100 005.4, 7 pages, dated Oct. 25, 2017.
Office Action for EP Patent Application No. 17 826 457.8, 10 pages, dated Feb. 22, 2021.

* cited by examiner

METHOD FOR STEERING A VEHICLE WITH AN AUTOMATIC OPERATING MODE, AND VEHICLE WITH AN AUTOMATIC OPERATING MODE

CROSS-REFERENCE TO RELATED APPLICATIONS

This application claims priority to German Patent Application No. DE 10 2017 100 005.4, filed on Jan. 2, 2017 with the German Patent and Trademark Office. The contents of the aforesaid Patent Application are incorporated herein for all purposes.

TECHNICAL FIELD

The present invention relates to a method for steering a vehicle having an automatic operating mode. It further relates to a vehicle having an automatic operating mode.

BACKGROUND

Automatic control of vehicles, in particular automatic steering, makes possible a significant improvement in driving comfort as well as in the safety of the vehicle occupants. The vehicle driver is relieved of strenuous driving tasks by means of partially or completely automated steering, the journey is less tiring and the time spent in the vehicle can be used for other tasks in a highly automated vehicle.

However, in many cases, surrendering manual control of the vehicle to automatic systems is accompanied by a sensation of uncertainty with regard to the correct functioning of the system. In particular drivers who are accustomed to manual control of the vehicle feel at the mercy of the automatic control system and they therefore feel unsafe. A fundamental reason for this is that the majority of control processes are carried out in a manner not visible or transparent to the user.

In the method described in DE 10 2015 210 887 A1 for displaying acceleration in a vehicle, the acceleration is detected and illumination is produced in the vehicle interior such that an acceleration parameter is used to output the detected acceleration. Chaser lights in particular are used for this.

SUMMARY

An object of the present invention is to provide a method and a vehicle of the type mentioned at the outset which enable automated driving while at the same time outputting information on the operation and function of the automated steering in a quick and intuitive manner.

This object is solved according to the invention by means of a method and a vehicle having the features of the independent claims. Some embodiments are the subject matter of the dependent claims.

BRIEF DESCRIPTION OF THE DRAWINGS

The above and other aspects will in the following be discussed with reference to exemplary embodiments. In the FIGS..

DETAILED DESCRIPTION

Figure 1:
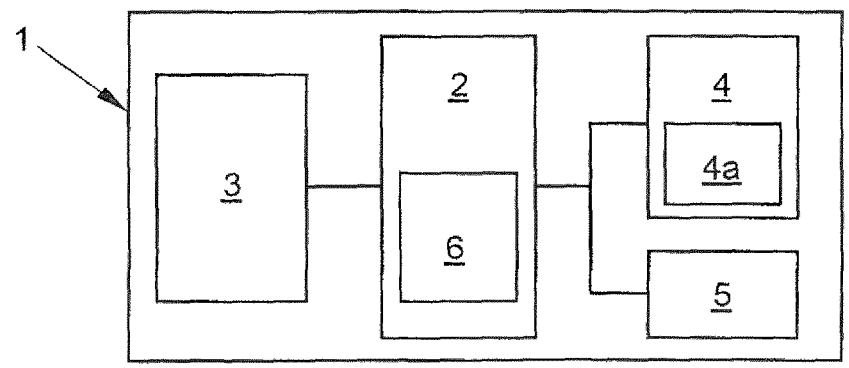
FIG. 1 shows an exemplary embodiment of a vehicle according to one aspect.

In one exemplary aspect, a method of the type mentioned at the outset, a steering angle is automatically determined for a steering device of the vehicle and is converted by the steering device. A value of an output parameter is determined using the automatically determined steering angle and the value of the output parameter is output by an output device using a light effect.

As a result, easily perceivable feedback for an automatic function of the steering of the vehicle can be output.

In the present context, "steering" refers to control of the movement of the vehicle in the transverse direction, i.e., guiding of the vehicle in a direction transverse to the travel direction, in particular to the right or left. An angle of the axis of the wheels relative to the longitudinal axis of the vehicle, in particular, is controlled by means of a steering device of the vehicle, the travel direction additionally being adjusted. For this purpose, it is conventional to provide a steering wheel as the input device, which can be rotated and by means of the position of which a particular steering angle of the wheels can be set. This may be achieved by means of a mechanical coupling between the rotatably mounted steering wheel and the steering device of the vehicle or by means of another type of coupling. For example, control signals for electric motors may be generated by means of a rotation of the steering wheel, which control signals then cause a corresponding adjustment of the angle of the wheels. The input of the steering angle may also be achieved in another manner, for example by means of a joystick or control stick.

During automatic steering of the vehicle, the desired steering angle is calculated and converted by means of the steering device. This happens automatically in a manner known per se, i.e., without predefinition of a specific steering angle by a user. For example, sensors of the vehicle may detect data relating to the surroundings and use said data to determine the steering angle, for example in order to guide the vehicle along a particular traffic lane. The steering angle determined in this manner may then be converted by means of the steering device. Moreover, the steering angle may be determined by means of sensors which detect the position of the wheels of the vehicle relative to the vehicle longitudinal axis. Depending on the steering device used, different angles can be provided for the wheels, a value of a particular common steering angle being determined. Alternatively or additionally, acceleration, in particular lateral acceleration of the vehicle, may be determined and taken into account when determining the value of the output parameter.

The conversion of the steering angle by means of the steering device is also achieved in a manner known per se, various designs and methods being known for this purpose.

The output parameter may be formed in a different manner using the steering angle. The value of the output parameter may for example comprise the steering angle, it may be approximately proportional thereto or be formed in a linear or non-linear manner based on the steering angle. In particular, the value of the output parameter may comprise information on the magnitude and/or direction of the steering angle.

In one embodiment, the light effect comprises a local distribution of a light parameter. The light effect is thus generated in a particularly easily perceivable manner.

The generation and output of the output parameter by means of the light effect may be achieved in various ways that are known per se. Within the meaning of the present aspect, "light effect" refers to a configurable emission of light. Such emission of light may be achieved in various ways, for example by means of light-emitting diodes (LEDs, OLEDs), a liquid crystal display (LCD, TFT), light bulbs, a projection apparatus or other means for emitting light. Furthermore, the light effect may be altered by means for configuring passive light emission, for example by means of scattering or reflection.

Moreover, a plurality of light sources, for example light-emitting diodes, may be arranged one next to or behind the other, it being possible to produce a line of light, for example, in particular along an open or closed annular surface. Furthermore, the light effect may be produced by means of indirect light emission of a surface, for example by means of one or more light sources being arranged so as to be hidden from a typical viewer and illuminating a surface such that the viewer cannot directly see the light source or ground-glass screen arranged in front thereof, but rather the emission of light is directed toward the viewer by means of reflection and scattering. The light effect may also be produced by means of a display, i.e., using a matrix of individual image points that can be activated as separate light sources.

The emission of light may in particular be varied with time. In other words, the emission of light can be changed, it being possible to form light parameters, such as an intensity distribution, contrast, colors, a spatial distribution and/or a dynamic change, in different manners depending on the time. The change that depends on time may in particular be synchronized with a change in the output parameter.

For example, the output device may be designed such that a local maximum or minimum of a light parameter can be formed at a particular position. A local extremum of this kind, such as of the brightness, may further be formed such that the position thereof varies with time, i.e., a movement of the maximum or minimum is displayed. Furthermore, a broadening or narrowing of a light distribution may be displayed, for example in that a gradient decreases (broadening of the distribution at the position of the extremum) or increases (sharper delimitation of the extremum) with time in the vicinity of a local extremum of a light distribution. The change in the light distribution may be symmetrical or asymmetrical.

Furthermore, a light distribution may be realized as a distribution of points or spots of various sizes and brightnesses, for example by creating a display of luminous particles. This may also be achieved in a manner known per se, for example by means of a backlit ground-glass screen, the transparency of which is designed to be different in different regions. By means of backlighting using several light sources, in this case, a change in the location of the brightness distribution can be output, giving the impression that points of light are moving.

The value of the output parameter is output by means of the light effect, i.e., information about the value of the output parameter can be obtained by means of the light effect. This may be achieved in different ways using suitable parameterization of the light effect. The parameterization is achieved by means of a relationship between the output parameter and the light effect, for example in that a parameter of the light effect is formed proportionally to or in linear or non-linear dependence on the value of the output parameter. Alternatively or additionally, the value of the output parameter may be output in that the light effect incorporates a speed of a change in the light distribution, for example a speed of a movement of a local maximum of the light distribution.

In one embodiment, the light effect has a display angle and the value of the output parameter is output based on the display angle. The display angle may for example be functionally related to the steering angle. For example, the light effect has an intensity maximum at the display angle which changes in accordance with the steering angle. By using a display angle as a parameter of the light effect, a particularly simple and intuitive conceptual link to the steering angle may be established during the steering procedure.

The light effect may for example be produced such that the position thereof can be parameterized based on the display angle. The light effect may for example show a position of a local extremum in the light distribution thereof along an annular line of light or an annular arranged row of light sources, it being possible to parameterize the position based on an angle proceeding from a central point in the ring.

Furthermore, a temporal change in the display angle may be used as a parameter of the light effect for outputting the value of the output parameter, for example in that, the wider the steering angle relative to the longitudinal axis of the vehicle, the faster the display angle change displayed.

In another embodiment, the light effect does not incorporate a change in the local distribution of a light parameter, but rather another change in the light parameter. For example, the brightness, the color and/or another statistical light parameter may vary depending on the value of the output parameter. A widening of the steering angle is in this case represented by greater brightness during light emission and/or another color of the light emission. For example, a steering angle of zero degrees may be represented by an emission of blue light. The wider the steering angle, the further the spectrum of the light emission shifts toward an emission of red light. Alternatively or additionally, when a steering angle is zero degrees, only light having a very low intensity may be emitted. As the steering angle widens, the light intensity of the light emission increases in accordance with the widening of the steering angle.

In another embodiment, the light effect may be a flashing light, the flashing frequency depending on the steering angle.

In one embodiment, a manual operating mode may further be activated, an actual degree of displacement of an input device being converted into the steering angle of the steering device when the manual operating mode is activated. As a result, intuitive manual operation of the control is made possible. In particular, the actual degree of displacement and the steering angle are in a proportional, linear or non-linear relationship with one another.

The input device may be mechanically displaced, a displacement about a degree of freedom in particular being provided. The degree of displacement depends on the type of input device used. In an embodiment of the input device as a steering wheel, the degree of displacement is an angle of rotation, whereas in the case of a joystick or control stick, a deflection of the operating element in a particular direction is detected as the degree of displacement.

For example, a transformation is carried out in order to convert the degree of displacement of a steering wheel into a steering angle of the steering device, by means of which transformation the angle of rotation of the steering wheel is assigned a position of the wheels with respect to the longitudinal axis of the vehicle.

In one embodiment, the output device is arranged on the input device. In particular, the output device is rigidly connected to the input device. Furthermore, the output device may be arranged on an element of the input device that moves when the actual degree of displacement of the input device is adjusted.

For example, the output device is attached to a steering wheel or integrated in the steering wheel. For example, the output device may be designed as a circumferential line of light on the edge of the steering wheel or as an at least partially closed ring. In addition, the output device may in this example be arranged as a display on the steering wheel, i.e., on the side of the steering wheel facing the driver of the vehicle.

In another embodiment, if the automatic operating mode is activated, a calculated degree of displacement is determined based on the determined steering angle, it being determined to which actual degree of displacement the automatically determined steering angle corresponds. As a result, an output may occur by means of the light effect such that an actual displacement of the input device is displayed.

In one embodiment, the calculated degree of displacement is output by means of the light effect. As a result, an output of a relationship between the degree of displacement and the value of the output parameter that is particularly simple to understand is achieved.

In another embodiment, the actual degree of displacement encompasses an angle of rotation. The output parameter may in this way be displayed in a particularly simple manner using the display angle.

If the input device is a steering wheel, for example, the degree of displacement corresponds to an angle of rotation of the steering wheel. In manual mode, the actual degree of displacement, i.e., the actual angle of rotation of the steering wheel, is converted into the steering angle. In automatic mode, this process may take place in reverse, i.e., the actual degree of displacement may be obtained depending on the automatically determined steering angle, for example the steering wheel is rotated by the steering angle. In this way, the vehicle occupants are made aware of which procedures are being carried out by the automatic control, for example in that, the wider the steering angle, the greater the extent to which the steering wheel is rotated.

In the automatic operating mode, the movement of the steering wheel may furthermore be decoupled from the actual steering angle of the steering device, in particular such that the movement of the steering wheel does not depend on the steering angle. The steering wheel may for example remain in a neutral position. By means of the method according to the present aspect, instead of an actual change in the degree of displacement, the value of output parameter, in particular a measure of the steering angle, may be output by means of the light effect.

For example, in the automatic operating mode, a steering wheel may remain in a particular position and in an especially neutral degree of displacement, while the value of the output parameter is output by means of an output device arranged on the steering wheel. The neutral degree of displacement refers in particular to the degree of displacement at which travel in a straight line would take place in the manual operating mode. For example, the light effect may be generated such that a local extremum of a light distribution is produced at an angle relative to an axis of the steering wheel, which angle is formed depending on the steering angle.

In this case, and in one embodiment, the extent to which the input device would have to be displaced is determined, i.e., for example, the angle of rotation by which the steering wheel would have to be rotated in order to produce the calculated steering angle. It is therefore determined, for instance, how far the steering wheel would have to be rotated in order to achieve the same steering angle in manual operation as that currently determined in automatic operation. Said angle of rotation is then output by means of the light effect based on the value of the output parameter.

In one embodiment, the input device may be shifted between a rest position and an operating position if the automatic operating mode is activated. In particular, the shifting may take place at a transition between the automatic and manual operating mode. As a result, a particularly efficient use of the vehicle can be made possible in the automatic operating mode.

For example, if the automatic operating mode is activated, a steering wheel can be shifted into a rest position in which it occupies less room in the interior of the vehicle. Moreover, conversely, said steering wheel may be moved to an operating position when switching to manual operating mode. In the rest position, the steering wheel may for example lock into place and/or be used for example to support objects placed thereon or fastened thereto, for example a mobile telephone or a tablet PC. In addition, in rest mode, there may be more space available for movements of the driver, whereas in operating mode, the input device occupies more space.

In one embodiment, an operating action is detected and the input device is shifted depending on the operating action detected. As a result, the shifting of the input device between the rest position and the operating position may be prompted in a particularly simple manner by the user.

For example, the operating action may involve an actuation of a particular operating element, such as a tap of a switching element or actuation of a switch. In addition, based on the operating action, a transition from the manual to the automatic operating mode or from the automatic to the manual operating mode may be effected.

In another embodiment, a transition animation can be produced and output by means of the output device during a switching between the automatic and manual operating modes. As a result, switching between the operating modes is displayed in an easily comprehensible manner.

The transition animation may take various forms. For example, the transition animation may involve a change in the light distribution of the output device, in which a transition from a light distribution in manual operating mode to a distribution using the former explained light effect is output. For example, a propagation of a pulse of light from a particular position over the entire output device may be displayed.

In one embodiment, an approach of a user to the input device is detected and the automatic or manual operating mode is activated depending on the detected approach. The switching between operating modes may therefore be carried out in a particularly simple manner.

For example, the manual operating mode may be activated if a user touches the input device, i.e., in particular the steering wheel, approaches said input device, and/or reaches therefor. Conversely, the automatic operating mode may be activated if a user moves away from the input device, i.e., in particular if the user releases the steering wheel and/or moves away from the steering wheel.

The approach is detected in a manner known per se, for example using capacitive sensors, using detection radiation reflected by a hand of the user for example, or using other methods. In the process, it may be detected whether and in what way the input device is being touched and whether the user is in the vicinity of the input device and if so, in which spatial region.

It can further be taken into consideration at which position relative to the input device the user, i.e., in particular a hand of the user, is detected to be. For example, a transition animation can be produced during switching between operating modes such that a light effect propagates from the position at which the hand of the user is touching the steering wheel or last touched the steering wheel, or is concentrated on said position.

This exemplary embodiment enables an automatic transition from the manual into the automatic operating mode if the driver releases the input device and/or moves away therefrom. Conversely, the manual operating mode may be activated automatically and the user may take over manual control once again by approaching the input device and/or touching same.

In particular, in the manual operating mode, no light distribution or a uniform light distribution may be produced by means of the output device and during the transition into the automatic operating mode, a non-uniform light distribution may be produced by means of the light effect. The transition animation may in this case involve a transition to the non-uniform light distribution of the automatic operating mode.

The transition animation may also involve further means for generating a light distribution in the vehicle, in particular an apparatus for generating an interior lightning. Said apparatus may for example comprise a light bar which is arranged in the interior of the vehicle, for example in the region of the dashboard and/or to the side of the vehicle. In another example, it may be provided that the light strips may also output information about acceleration of the vehicle, in particular lateral acceleration of the vehicle. This may assist output of the value of the output parameter, which is formed depending on the steering angle, since the lateral acceleration acting on the vehicle is altered by adjusting the steering angle of the steering device when driving around a curve.

In another aspect, a vehicle is provided having an automatic operating mode comprises a control unit, by means of which a steering angle for a steering device of the vehicle may be automatically determined, the steering device being able to convert the steering angle, and also an ascertaining unit, by means of which a value of an output parameter can be determined using the automatically determined steering angle. Said vehicle may also comprise an output device, by means of which the value of the output parameter may be output using a light effect.

The exemplary vehicle is in some embodiments designed to implement the above-described method. The vehicle thus has the same advantages as the method according to the preceding aspect.

In one embodiment of the vehicle, the output device comprises several light sources arranged one next to the other, the light sources emitting light in order to generate the light effect. The light effect is generated in that a light parameter of the light emitted by the light sources is altered successively by individual light sources arranged one next to the other or by groups of light sources arranged one next to the other. This makes possible a design of the output device as chaser light and/or a design using a light distribution along a row of adjacent light sources.

In another embodiment, a manual operating mode may also be activated and the vehicle further comprises an input device. If the manual operating mode is activated, it is possible to convert an actual degree of displacement of the input device into the steering angle of the steering device. The input device may be designed as a steering wheel, it being possible to determine the actual degree of displacement based on an angle of rotation of the steering wheel.

In one embodiment, the output device is arranged on the input device. In particular, the output device is arranged directly at or on a surface of the input device that moves if the actual degree of displacement of the input device is altered. The output device is for example arranged on a steering wheel or is mechanically connected thereto.

In another embodiment, the input device has an approach detection apparatus, by means of which an approach of a user to the input device can be detected, and the automatic or manual operating mode can be activated depending on the detected approach.

In particular, a position of the user, in particular of a hand of the user, relative to the input device can be determined. This makes it possible to implement an automatic transition between a manual and the automatic operating mode.

The invention will now be explained in more detail based on further exemplary embodiments with reference to the drawings.

An exemplary embodiment of the vehicle will be explained with reference to FIG. 1.

A vehicle 1 comprises a control unit 2, which in turn comprises an ascertaining unit 6. A steering device 3, an input device 4, in the exemplary embodiment shown a steering wheel 4, and an output device 5, in the exemplary embodiment shown a light strip 5, are coupled to the control unit 2.

The light strip 5 is arranged on the steering wheel 4 in the exemplary embodiment shown, in particular it extends substantially in parallel with the perimeter of the steering wheel 4 in an open ring shape. Furthermore, in the exemplary embodiment shown, the steering wheel 4 comprises an approach detection unit 4a, by means of which it can be detected whether and at which position a user, in particular a hand of a user, is approaching the steering wheel and/or whether and at which position a user is touching the steering wheel 4.

In other exemplary embodiments, the light strip 5 is designed as a completely circumferential ring that extends in parallel with the perimeter of the steering wheel 4. Furthermore, the light strip may be designed as a display, as an LCD or having light bulbs, or in another way.

According to the present embodiment, the vehicle 1 may be operated in an automatic operating mode. Furthermore, a manual operating mode may be activated in this exemplary embodiment. The various operating modes are activated in a manner known per se, in particular by means of a user input or automatically.

If the manual operating mode is activated, a user, in particular the driver of the vehicle 1, can input a steering angle by means of an input using the input device 4, i.e., the steering wheel 4, which steering angle is converted by the steering device 3 of the vehicle 1.

During conversion of the steering angle, wheels of the vehicle 1 are adjusted by means of the steering device 3 such that the axes thereof are at a specific angle relative to a longitudinal axis of the vehicle 1, as a result of which lateral control of the vehicle can be adjusted. In particular, the travel direction of the vehicle 1 may be altered in this way.

If the automatic operating mode is activated, the steering angle is automatically determined. This happens in a manner known per se, for example using data detected by sensors of the vehicle 1 and processed by means of the control unit 2 such that a target trajectory of the vehicle 1 is determined and the steering angle is calculated in order to achieve the target trajectory. In this case lateral control of the vehicle 1 takes places automatically.

Furthermore, other operating modes may be provided which provide for an at least partially automatic control, for example a lane departure warning system, which only intervenes in the lateral control of the vehicle 1 if the vehicle 1 threatens to leave a predefined traffic lane, or an overtaking assistance system, which assists the driver of the vehicle 1 during overtaking maneuvers.

A first exemplary embodiment is explained with reference to FIG. 1 and to FIG. 2A to 2C. The exemplary embodiment of the vehicle explained above with reference to FIG. 1 is in particular used as a basis for this.

In the method, a steering angle for the steering device 3 of the vehicle 1 is automatically determined and converted by the steering device 3 in the automatic operating mode of the vehicle 1. A value of an output parameter is ascertained based on the steering angle, which value is then output by means of an output device 5, shown in the example of the light strip 5. A light effect 7 is generated in order to output the value of the output parameter. The value of the output parameter may be obtained using various variables. In particular, said value comprises a measure of the determined steering angle. For example, the value may be proportional to the steering angle or have a linear or non-linear dependence on the steering angle.

Figure 2A:
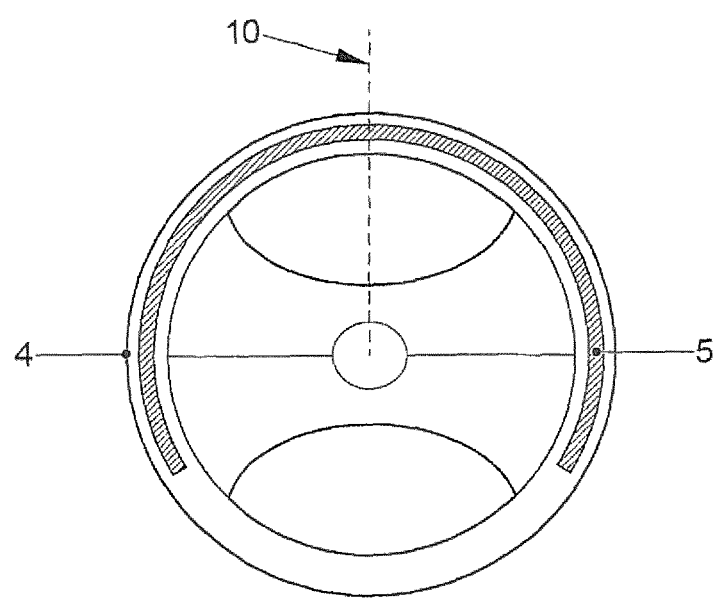
FIG. 2A to 2C show a first exemplary embodiment of a method according to one aspect.

FIG. 2A shows a steering wheel 4, which has a circular perimeter as is known per se and which is mounted so as to be rotatable about the central point of the circular shape. A rotation of the steering wheel 4 is characterized by a degree of displacement which corresponds to an angle of rotation $\alpha$ of the steering wheel 4. In the case depicted in FIG. 2A, the steering wheel is in a neutral position 10, corresponding to an angle of rotation $\alpha$ of 0.

Furthermore, a light strip 5 is arranged on the steering wheel 4. In this exemplary embodiment, the light strip 5 is integrated in the steering wheel 4, i.e., when the steering wheel 4 rotates, the light strip 5 also rotates to the same extent. In this exemplary embodiment, the light strip 5 comprises light-emitting diodes (LEDs, OLEDs) arranged in a row, above which a diffuser layer is arranged. A viewer looking at the surface of the light strip 5 therefore cannot directly see the emissions of light generated by the individual light-emitting diodes of the light strip 5, but rather the emission of light is scattered by means of the diffuser layer. This way, the individual light-emitting diodes are not directly visible, but rather a luminous strip is formed, it being possible to configure the spatial distribution of the light emission along the light strip 5 in different manners that are known per se.

Figure 2B:
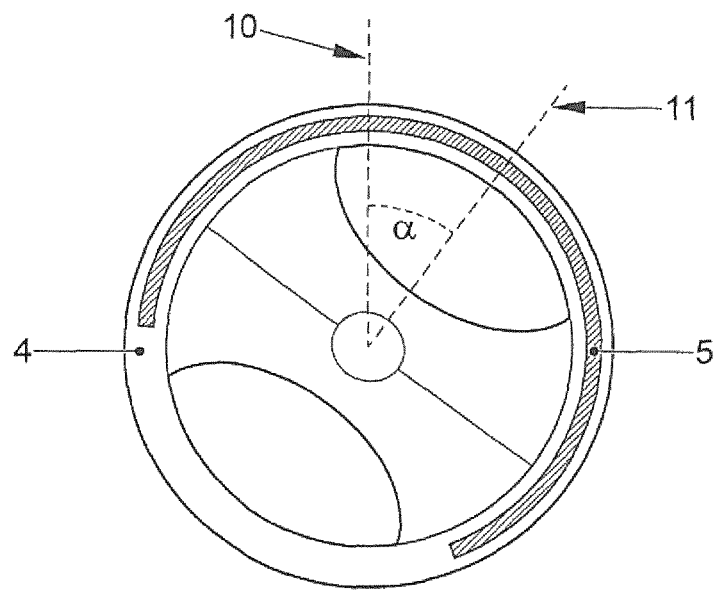

In the case depicted in FIG. 2B, the steering wheel 4 is shown rotated by the angle of rotation $\alpha$. In this exemplary embodiment, the angle of rotation $\alpha$ refers to the angle formed by an axis of symmetry of the steering wheel 4 in the neutral position 10 and the axis of symmetry of the rotated steering wheel 4 in the turned position 11.

If the manual operating mode is activated, the steering wheel 4 is rotated manually by the driver of the vehicle 1. The driver therefore determines the steering angle by rotating the steering wheel 4 and thus also determines the lateral control of the vehicle 1. However, if the automatic operating mode is activated, the steering angle is automatically determined and converted by the steering device 3 of the vehicle 1. In this case, the steering wheel 4 is rotated by the angle $\alpha$ automatically, in particular by means of a motor, and serves as feedback for the user of the vehicle 1.

In particular, in the automatic operating mode, firstly the steering angle is determined and then it is calculated to which angle of rotation $\alpha$ of the steering wheel 4 said steering angle corresponds. The steering wheel 4 is then rotated by said calculated angle of rotation $\alpha$. In other exemplary embodiments, the automatic rotation of the steering wheel by an angle of rotation $\alpha$ may occur in a different manner, for example in that a lesser or greater rotation of the steering wheel 4 is produced in the automatic operating mode than would be the case with a manual rotation in the manual operating mode.

Figure 2C:
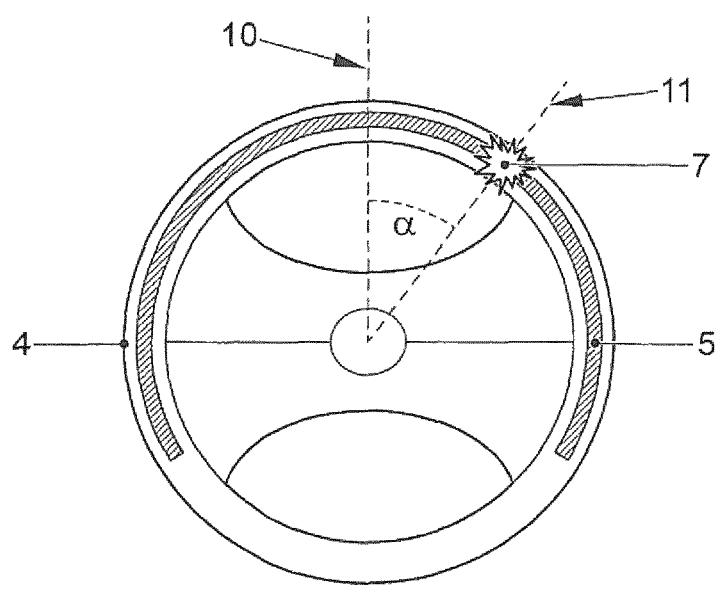

In the case depicted in FIG. 2C, the automatic operating mode of the vehicle 1 is activated and the lateral control of the vehicle 1 is carried out based on a calculated steering angle. Using this steering angle, the angle of rotation $\alpha$ for the steering wheel 4 is calculated. Unlike in the case depicted in FIG. 2B, the steering wheel 4 is not rotated, but rather a light effect 7 is generated, by means of which the angle of rotation $\alpha$ is output. Said light effect 7 is produced at a specific position along the light strip 5, said position being determined such that it corresponds to a deflection by the angle of rotation $\alpha$ proceeding from the neutral position 10. In other words, the light effect 7 has a display angle that corresponds to the (calculated) angle of rotation $\alpha$. In particular, the position of the light effect 7 on the light strip 5 of the steering wheel 4 corresponds to the point of intersection between the extension of the light strip 5 and a line which corresponds to the hypothetical axis of symmetry of the steering wheel 4 during a rotation by the calculated angle of rotation $\alpha$.

The light effect 7 is generated in a manner known per se. For example, a light distribution is produced along the light strip 5, the light distribution involving a non-uniform emission of light in the extension direction of the strip 5. The light distribution relates for example to the intensity, color or another parameter of the emission of light. Moreover, the light distribution may relate to a dynamic parameter, for example a flashing speed or a periodic change in another light parameter. The light distribution is produced such that a particular position of a light effect 7 can be detected. Such a position may for example be detectable using a local extremum of the light distribution for a particular light parameter, for example using a local brightness maximum or minimum. In other exemplary embodiments, several positions of the light effect 7 may be detectable, for example by producing several local extrema or by displaying several points of light.

In other exemplary embodiments, the position at which the light effect 7 is generated may be determined in another way. For example, depending on the steering angle, a static light effect 7 may not be produced at a fixed position of the light strip 5, but rather the light effect 7 may also move by a fixed steering angle, the movement being faster the wider the steering angle. In this case, by means of the movement of the light effect 7 a direction of the angle of rotation, and based on the movement speed of the light effect 7 the magnitude of the steering angle, may be output.

In other exemplary embodiments, the light effect 7 extends over the entire light strip 5 or over another illuminated surface. In this case the steering angle is not output by means of the light effect being output locally in another position, but rather the light intensity and/or color of the light emission of the light strip 5 or respectively luminous region varies with a varying steering angle. The wider the steering angle, the brighter the luminous region lights up or respectively the further the spectrum of the light emission shifts toward a particular color, for example into the red spectral range.

A second exemplary embodiment is explained with reference to FIGS. 3 to 14. The exemplary embodiment of the vehicle explained above with reference to FIG. 1 is in particular used as a basis for this.

Figure 3:
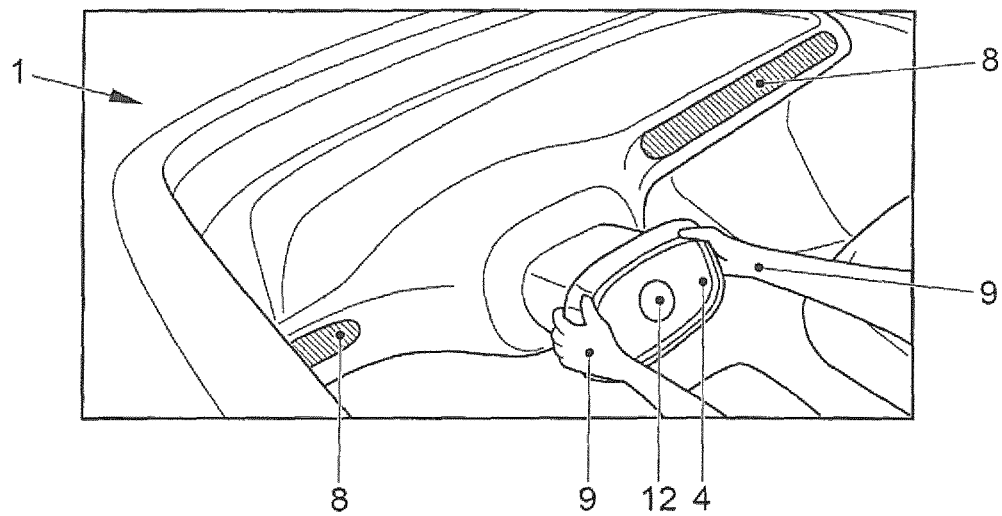
FIGS. 3 to 14 show a second exemplary embodiment of the method according to one aspect.

In the case depicted in FIG. 3, the manual operating mode of the vehicle 1 is activated. The driver of the vehicle 1 operates the steering wheel 4 using their hands 9 and can influence the lateral control of the vehicle 1 in particular by rotating the steering wheel 4. Furthermore, an interior lighting system 8 that extends in the transverse direction along the dashboard and that has a light bar is arranged on the dashboard of the vehicle 1. Light particles may be displayed inside this light bar, said display taking place in a manner known per se and it being possible to realize said display in other ways in other exemplary embodiments, for example using a display of one row of light-emitting diodes or other light sources.

In this exemplary embodiment, the steering wheel 4 is not circular, but rather rectangular and has rounded corners. The input device may have a different design in other exemplary embodiments, any shape of the steering wheel 4 in principle being possible. In this exemplary embodiment, a logo 12 designed as a command button 12 is also arranged on the side of the steering wheel 4 facing the driver. In other words, the command button 12 can be operated and can be actuated by touch. Upon detection of said actuation by touch, a function may be executed as described in detail below.

Figure 4:
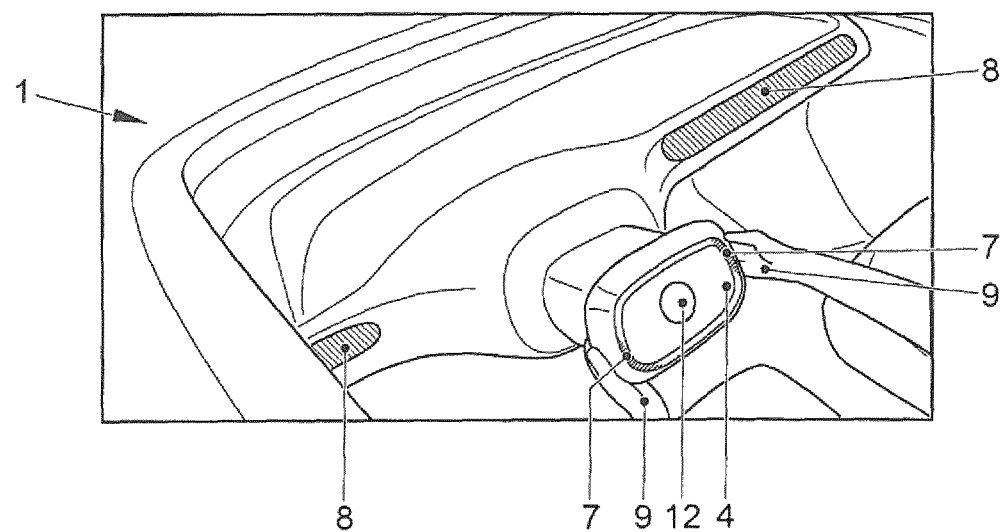

In the case depicted in FIG. 4, a handover scenario is shown. In this case the driver of the vehicle 1 is handing over control to an automatic system, i.e., the automatic operating mode of the vehicle 1 is activated proceeding from the manual operating mode. This occurs when the driver releases the steering wheel 4. The approach detection unit 4a, which is integrated in the steering wheel 4 in this exemplary embodiment, detects that the steering wheel 4 is no longer being touched, in contrast to that shown in FIG. 3, and that the hands 9 of the user are moving away from the steering wheel 4. It also detects the positions at which the hands 9 are arranged relative to the steering wheel 4.

A transition animation is then produced, which signals the transition from the manual operating mode to the automatic operating mode. In this exemplary embodiment, the steering wheel 4 has an apparatus for generating a light effect 7 that is arranged so as to be covered and extends within and in parallel with the perimeter of the steering wheel 4, an emission of light being generated and being indirectly visible on the surface of the steering wheel 4. The light effect 7 can be detected based on a light distribution, which comprises local extrema that are assigned to a particular position and that mark said position. In the example shown, said local extrema are brightness maxima of the emitted light.

In this exemplary embodiment, the light effect is generated such that the positions on the steering wheel 4 marked by the light effect 7 correspond to the positions where the hands 9 of the user last made contact. In other words, a light effect 7 is displayed in which maxima of light intensity occur where the hands 9 last touched the steering wheel 4. This way, it is made clear that the control passes from the hands 9 of the user to the vehicle 1.

Figure 5:
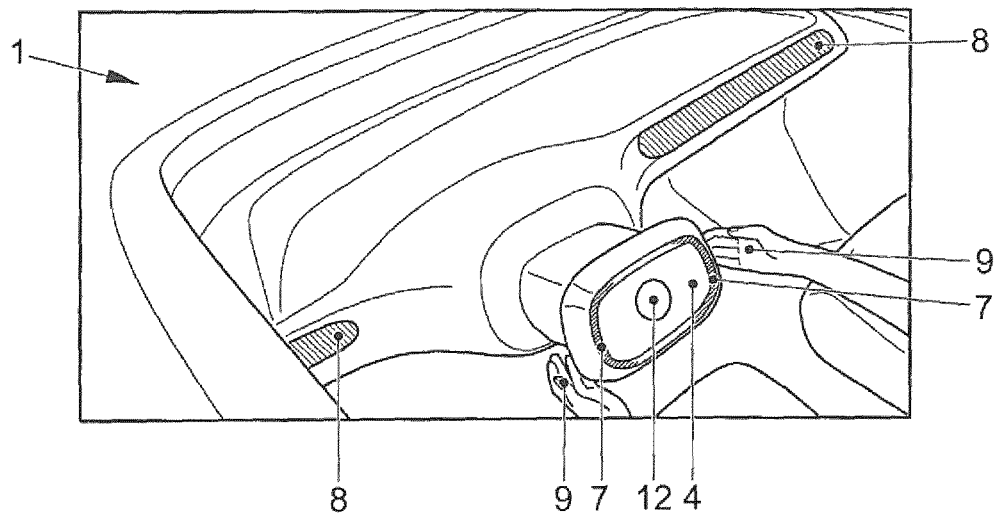

In the case depicted in FIG. 5, another, subsequent step of the handover animation is shown, the light effect 7 changing such that a broadening of the extrema of the light distribution shown in FIG. 4 is displayed, the light distribution spreading to the entire perimeter of the steering wheel 4. In particular, the broadening occurs to the same extent as the hands 9 move away from the steering wheel.

Figure 6:
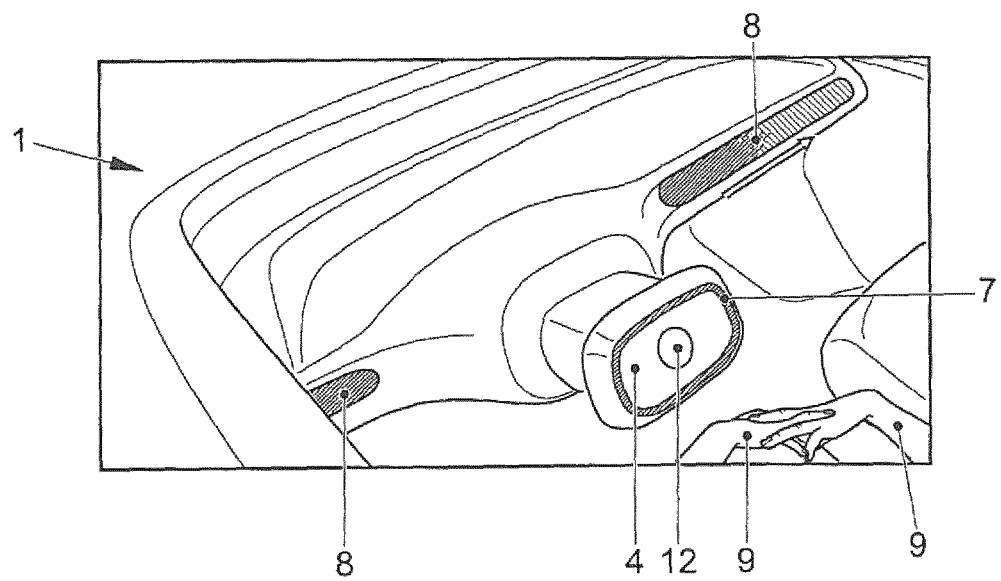

In the case depicted in FIG. 6, the light distribution of the light effect 7 ultimately broadens so far that a closed ring that is parallel to the perimeter of the steering wheel 4 appears on the steering wheel 4. Furthermore, the light effect 7 is shown to have spread to the interior lighting system 8, differently colored regions of the light emission moving along the interior lighting system 8.

In this exemplary embodiment, a light effect 7 having light distribution maxima located at the same point as the hands of the user is therefore produced in the case depicted in FIG. 4. Said maxima broaden and go through the phase shown in FIG. 5 before ultimately moving to the interior lighting system 8 in the case depicted in FIG. 6. In other exemplary embodiments, the light effect 7 may take another form and the manner in which it spreads may also differ.

In the case depicted in FIG. 6, the steering of the vehicle 1 is automatic. An angle of rotation for the steering wheel 4 is set depending on the steering angle, i.e., the steering wheel rotates by the same extent as the automatically determined steering angle changes. The steering wheel 4 in particular rotates as much as would be necessary in the manual operating mode for the same steering maneuver. In other exemplary embodiments, the steering wheel may be rotated in a different manner, for example to a greater or lesser extent, slower or faster, than would be required in the manual operating mode.

Figure 7:
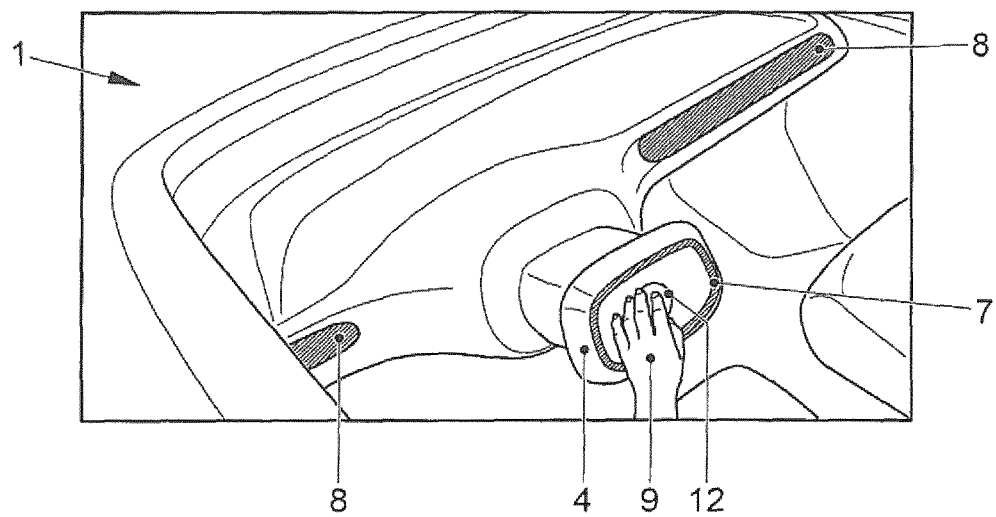

In the case depicted in FIG. 7, the user touches the logo 12 designed as a command button 12 arranged on the steering wheel 4 with their hand 9. As a result, the command button 12 is actuated and a control signal is generated. The steering wheel 4 is pushed toward the dashboard, where it ultimately locks into place. In other words, a transition takes place from an operating position, in which the steering wheel 4 can rotate or be rotated, to a rest position, in which the steering wheel does not move.

Figure 8:
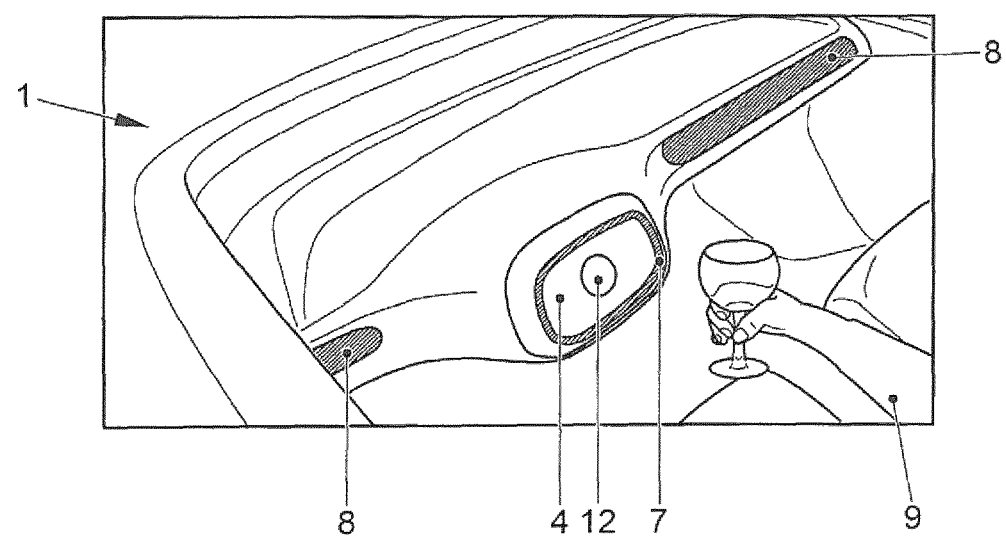

The arrangement of the steering wheel 4 in the rest position is shown in FIG. 8. In this case the steering wheel 4 is in this no longer rotated depending on the steering angle, but rather remains in a neutral position. The steering wheel 4 may now be used for other purposes, for example as a table or a support to which a mobile telephone or tablet computer can be fastened, for example.

Figure 9:
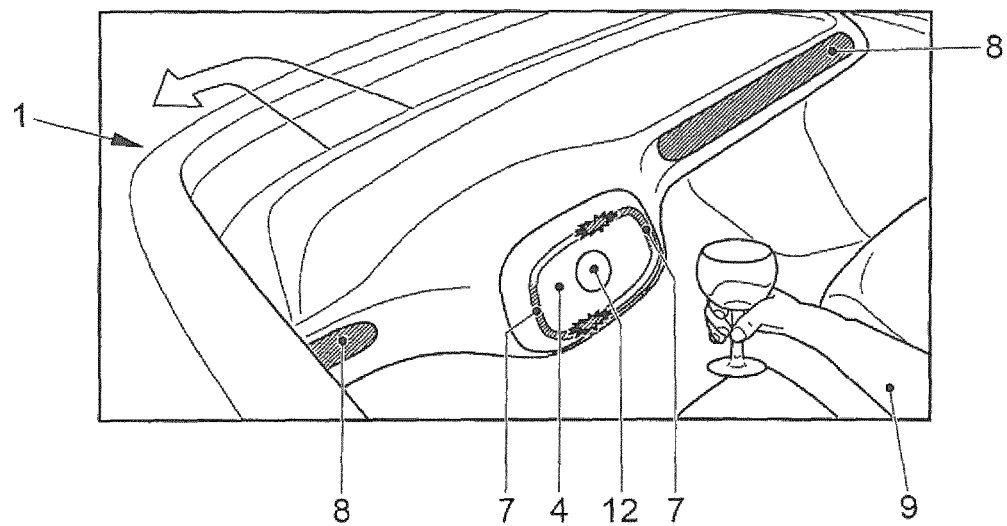

FIG. 9 shows a case in which the steering wheel 4 is in the rest position. Since no rotation of the steering wheel 4 is provided in this case, in order to display to a user the displacement of the steering angle, a light effect 7 is generated such that said rotation by a particular angle of rotation is output in a different manner. For this purpose, the light distribution in the region of the steering wheel 4 is realized such that local extrema are produced, in the case of the exemplary embodiment shown two opposing maximum lighting intensities. Said extrema move along the perimeter of the steering wheel 4 in accordance with the changed steering angle in a way that corresponds to a rotation of the steering wheel by means of which the relevant automatically determined steering angle would be achieved. That means, if a rotation of the steering wheel 4 by a particular angle of rotation would be required to manually adjust the steering angle, the light effect 7 is output at this angle on the steering wheel 4 in the rest position.

Furthermore, additional data can be output by means of the light distribution on the steering wheel 4 and by means of the interior lighting system 8. For example, it may be determined whether a change in travel direction is planned during automatic driving. Depending on the planned change, a light effect 7 may be generated for the steering wheel 4 and/or the interior lighting system 8 in order to output the corresponding planed steering angle. This may also be achieved using colors; for example, a color of a light effect 7 by means of which a planned change of direction is displayed may be changed depending on the distance of the vehicle 1 from the location of the planned change of direction, for example a crossroad.

Figure 10:
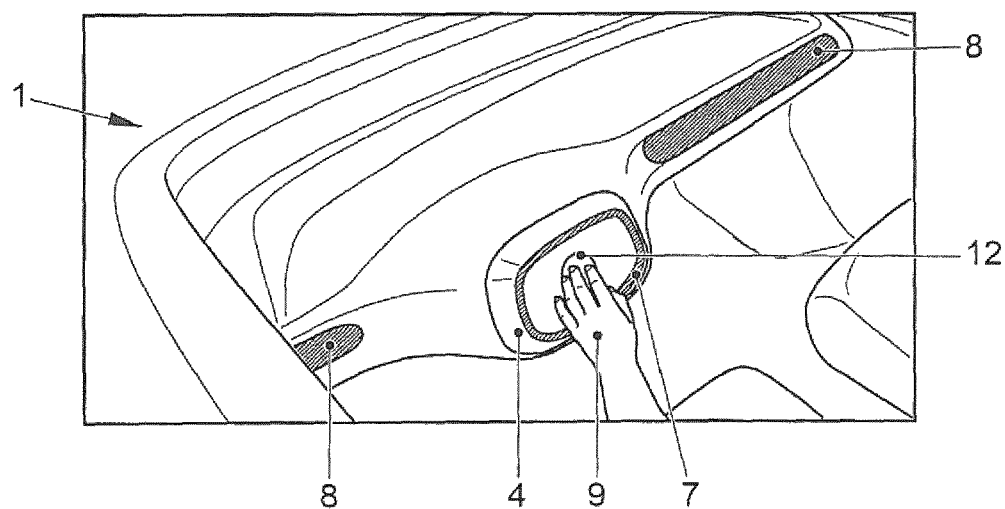
Figure 11:
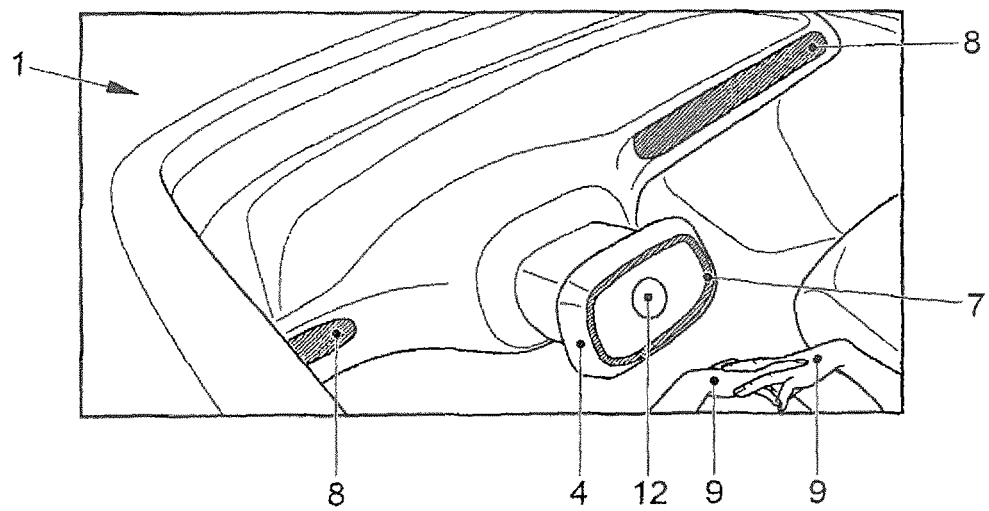

FIG. 10 shows a case in which the steering wheel 4 is in the rest position and the hand 9 of the user is actuating the command button 12 on the steering wheel 4. This causes the steering wheel 4 to extend, i.e., to move into the operating position, in which the steering wheel can be rotated. In FIG. 11, the case in which the steering wheel 4 has extended into the operating position is shown, the automatic operating mode remaining active at the same time. During automatic control of the vehicle 1, the steering wheel 4 again rotates in order to indicate the adjustment of the automatically determined steering angle.

Figure 12:
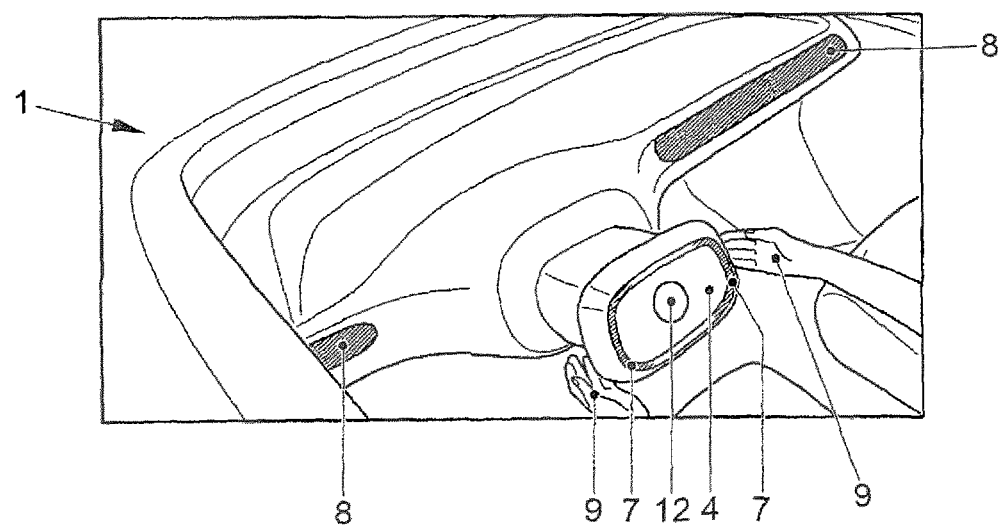

In the case depicted in FIG. 12, the start of a switching from the automatic to the manual operating mode is shown. The hands 9 of the user are approaching the steering wheel 4 and the light distribution, which previously (as shown in FIG. 11) uniformly encircled the entire perimeter of the steering wheel 4, is gathering in the vicinity of the hands 9, i.e., the light distribution is formed such that a local maximum is produced at the point close to the hands 9 of the user.

Figure 13:
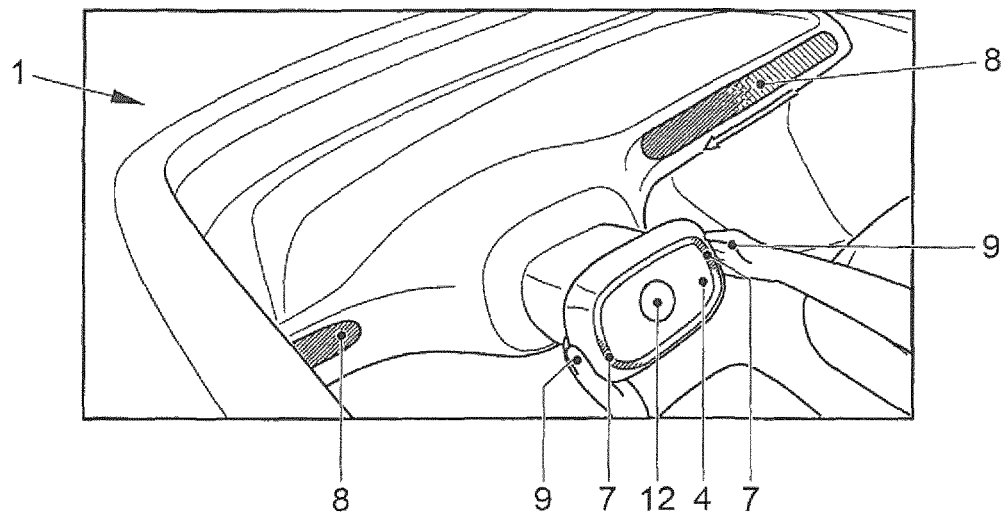

In the case depicted in FIG. 13, the user is touching the steering wheel 4 with their hands 9 and the light distribution is formed such that a narrowing intensity maximum of the light distribution is produced at the position of the hands 9 on the steering wheel 4. At the same time, by means of the interior lighting system 8, the light effect 7, which previously moved to the interior lighting system 8 during the transition from the manual to the automatic mode, is shown to be moving in the opposite direction again, i.e., from the region of the peripheral interior lighting system 8 to the steering wheel 4. This way, the control is shown to be transitioning back from the vehicle 1 to the user.

Figure 14:
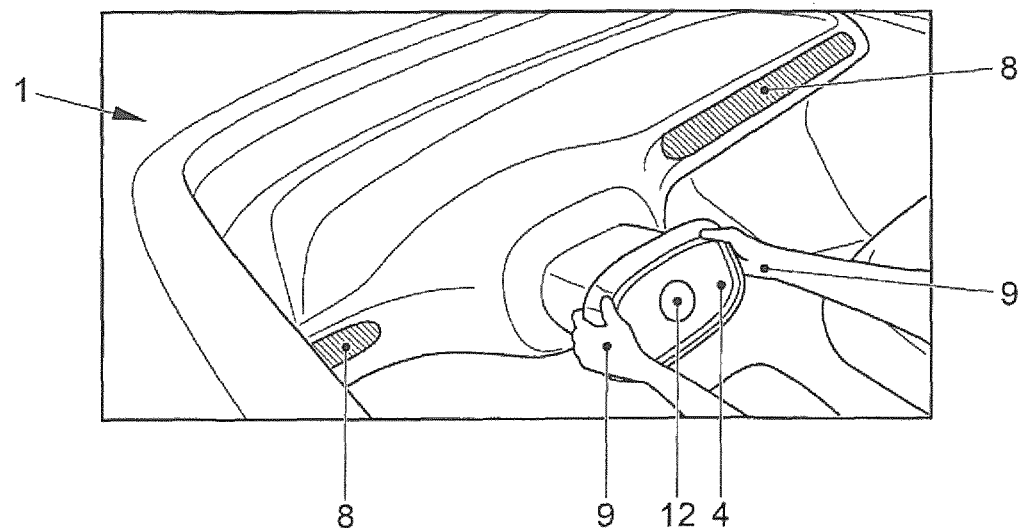

In FIG. 14, the case depicted in FIG. 3 is finally shown again, the switching into the manual operating mode now being complete and the steering angle being adjusted based on the manually altered angle of rotation of the steering wheel 4.

The broadening of the light effect 7 involving the interior lighting system 8 described with reference to this exemplary embodiment may also be dispensed with in other exemplary embodiments, i.e., the light effect 7 may remain restricted to the steering wheel 4 for all described steps.

In other exemplary embodiments, the steering wheel may also remain in the operating position and in the automatic operating mode in the rest position, without rotating with a changing steering angle.

In other exemplary embodiments, another type of input device 4 may be provided instead of the steering wheel 4, for example a control stick, a joystick or another type of input apparatus.

REFERENCE NUMBER LIST

1 Vehicle
2 Control unit
3 Steering device
4 Input device; steering wheel
4a Approach detection unit
5 Output device; light strip
6 Ascertaining unit
7 Light effect
8 Interior lighting system
9 Hand
10 Degree of displacement; neutral position
11 Degree of displacement; turned position
12 Command button; logo
α Angle of rotation The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for steering a vehicle having an automatic operating mode, wherein a steering angle is automatically determined for a steering device of the vehicle and is converted by the steering device; wherein a value of an output parameter is determined using the automatically determined steering angle; and the value of the output parameter is output by an output device using a light effect; wherein the vehicle also has a manual operating mode and in case the manual operating mode is activated, an actual degree of displacement of an input device is converted into the steering angle of the steering device; wherein the input device may be shifted from an operating position to a rest position when the automatic operating mode is activated; and wherein a transition animation light effect is output by the output device during a switching between the automatic operating mode and the manual operating mode.

2. The method of claim 1, wherein the light effect comprises a local distribution of a light parameter.

3. The method of claim 1, wherein the light effect has a display angle and the value of the output parameter is output based on the display angle.

4. The method of claim 1, wherein, if the automatic operating mode is activated, a calculated degree of displacement is determined based on the determined steering angle, and wherein it is determined to which actual degree of displacement the automatically determined steering angle corresponds.

5. The method of claim 4, wherein the actual degree of displacement encompasses an angle of rotation.

6. The method of claim 4, wherein the input device can be shifted between a rest position and an operating position if the automatic operating mode is activated.

7. The method of claim 1, wherein the calculated degree of displacement is output by the light effect.

8. The method of claim 7, wherein the actual degree of displacement encompasses an angle of rotation.

9. The method of claim 7, wherein the input device can be shifted between a rest position and an operating position if the automatic operating mode is activated.

10. The method of claim 1, wherein the actual degree of displacement encompasses an angle of rotation.

11. The method of claim 10, wherein the input device can be shifted between a rest position and an operating position if the automatic operating mode is activated.

12. The method of claim 1, wherein an operating action is detected and the input device is shifted depending on the operating action detected.

13. The method of claim 1, wherein during switching between the automatic and manual operating modes, a transition animation is generated and output by the output device.

14. The method of claim 1, wherein an approach of a user to the input device is detected and the automatic or manual operating mode is activated depending on the detected approach.

15. The method of claim 1, wherein in the rest position, the input device does not move.

16. The method of claim 1, wherein in the rest position, the input device is usable to support one or more of a mobile phone, a tablet computer, and a laptop computer.

17. The method of claim 1, wherein the input device comprises a command button, which upon actuation by a user causes the input device to shift between the operating position and the rest position.

18. A vehicle having an automatic operating mode and a manual operating mode, comprising
a control unit, using which a steering angle for a steering device of the vehicle is automatically determined, wherein the steering device is configured to convert the steering angle;
an ascertaining unit, using which a value of an output parameter is determined using the automatically determined steering angle;
an output device, using which the value of the output parameter is output using a light effect; and
an input device; wherein
in case the manual operating mode is activated, an actual degree of displacement of the input device is converted into the steering angle of the steering device; wherein
the input device may be shifted from an operating position to a rest position when the automatic operating mode is activated; and wherein
a transition animation light effect is output by the output device during a switching between the automatic operating mode and the manual operating mode.

19. The vehicle of claim 18, wherein the output device comprises several light sources arranged adjacent to each other, wherein the light sources emit light in order to generate the light effect, and the light effect is generated in that a light parameter of the light emitted by the light sources is altered successively by individual light sources arranged adjacent to another or by groups of light sources arranged adjacent to another.

20. The vehicle of claim 18, wherein the input device has an approach detection apparatus, using which an approach of a user to the input device is detectable, and the automatic or manual operating mode may be activated depending on the detected approach.

* * * * *